United States Patent

[11] 3,584,934

| | | |
|---|---|---|
| [72] | Inventor | Hollis E. French<br>North Chelmsford, Mass. |
| [21] | Appl. No. | 721,045 |
| [22] | Filed | Apr. 12, 1968 |
| [45] | Patented | June 15, 1971 |
| [73] | Assignee | Itek Corporation<br>Lexington, Mass. |

[54] NON-MECHANICAL SHUTTER
24 Claims, 1 Drawing Fig.

[52] U.S. Cl. .................................................. 350/160,
95/53, 252/300
[51] Int. Cl. ...................................................... G02f 1/28,
G03b 9/00
[50] Field of Search ........................................ 350/160 P,
160; 95/53; 260/326.11; 252/300

[56] References Cited
UNITED STATES PATENTS

| 2,986,982 | 6/1961 | Kaprelian | 95/53 |
| 3,100,778 | 8/1963 | Berman et al | 260/319 |
| 3,242,122 | 3/1966 | Cheng | 260/326.11 X |
| 3,249,034 | 5/1966 | Burgarella | 95/53 |

OTHER REFERENCES

" Photochromic Spiropyrans. I. The Effect of Substituents on the Rate of Ring Closure" by E. Berman et al. J. OF AM. CHEM. SOC., Nov. 5, 1959, Vol. 81 pp. 5605—8

*Primary Examiner*—Ronald L. Wibert
*Assistant Examiner*—J. Rothenberg
*Attorneys*—Homer O. Blair, Robert L. Nathans and W. Gary Goodson ABSTRACT: This invention relates to a nonmechanical shutter for a camera or similar device. The shutter is comprised of a transparent substrate, the color form of a compound which is thermally rendered colorless and the colorless form of a compound which is thermally rendered colored. The change of the colored compound to colorless form occurs prior to the change of colorless compound to colored form with the lapse of a finite period of time between these color changes. During this time period, the shutter is substantially light transparent, i.e. the shutter is in the open position. Thus when used in a camera, heating of the shutter renders the shutter transparent and permits exposure of the photosensitive medium of the camera. The time of exposure is determined by the combination of thermochromic substances in the shutter. The shutter is "cocked" after use by allowing the thermochromic change to reverse itself, or, when the thermochromic substances are also photochromic, by exposure to light which reverses the thermochromic color change, e.g. ultraviolet and visible light.

PATENTED JUN 15 1971          3,584,934
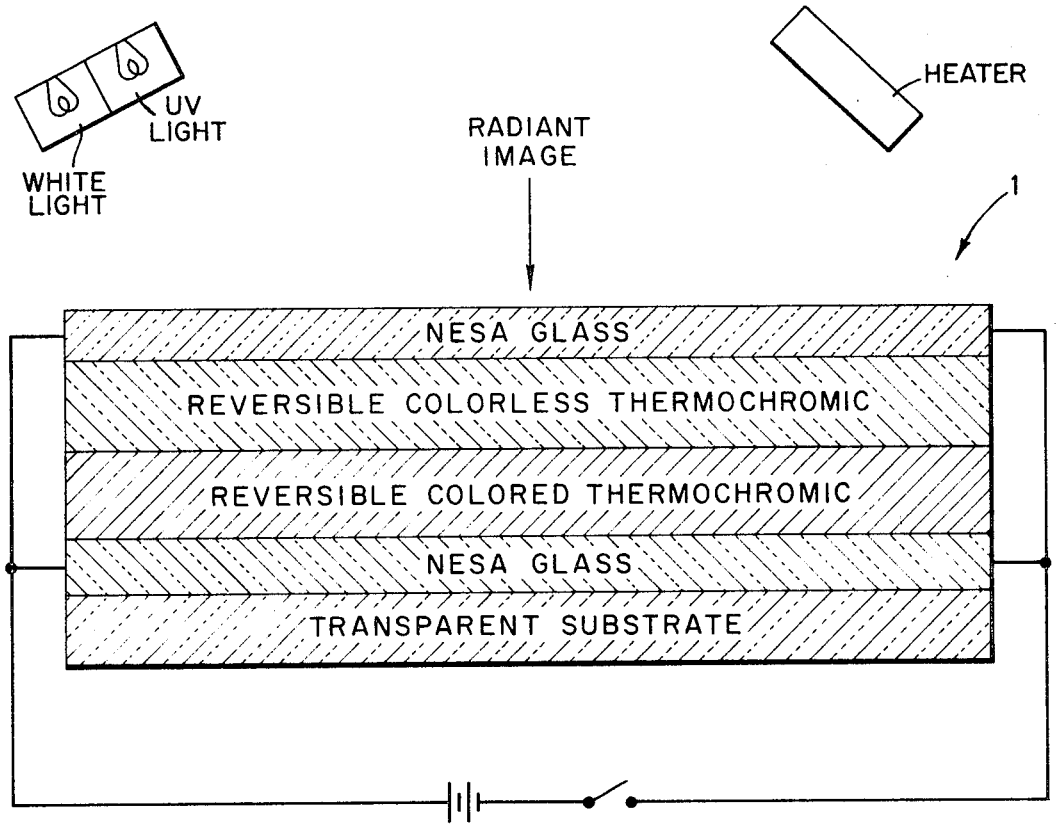
FIG. I
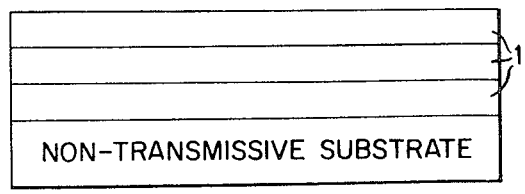
FIG. II
HOLLIS E. FRENCH
*INVENTOR.*
BY David E. Brook
*ATTORNEY.*

NON-MECHANICAL SHUTTER

BACKGROUND OF THE INVENTION

1. Field of the Invention

This invention relates to nonmechanical shutters for cameras and similar devices.

2. Description of the Prior Art

A common problem in the use of mechanical shutters on cameras is the vibration created by mechanical opening and closing of the shutter. Many attempts have been made to improve mechanical shutters to minimize the vibration problem and have not been completely successful. In addition, the more-refined mechanical shutters are of considerable economic cost.

Thermochromic compounds are well known in the art and generally comprise compounds which undergo color change on heating, the color change being generally reversible. Many thermochromic compounds are also photochromic, i.e. undergo color change when exposed to radiation energy, mainly ultraviolet light and visible light.

SUMMARY OF THE INVENTION

This invention relates to a relatively inexpensive and simple shutter for cameras and similar devices which operates due to color change of components of the shutter. The shutter comprises a transparent substrate, a color form of a thermochromic compound which is thermally rendered colorless and the colorless form of a thermochromic compound which is thermally rendered colored. For the system to operate as a shutter, there must be a lapse of a finite period of time between the respective color changes during which the medium is substantially transparent and will permit passage of image patterns of activating radiation therethrough. When used in a camera or similar device, the shutter is placed in the optical path and, when transparent, permits photoexposure of the photosensitive medium of the camera. The shutter is "cocked" for reuse by merely reversing the thermal color changes.

The shutter is free from the deficiencies of mechanical shutters particularly since there are no vibrations and is a rather simple, inexpensive device which can be used repeatedly. By selection of various combinations of thermochromic compounds as well as by varying the heating rate, the shutter opening, i.e. the time period of transparency, can be altered over a wide range. These and other advantages of the present invention will be apparent from the following disclosure.

BRIEF DESCRIPTION OF THE DRAWINGS

FIG. I is a diagrammatic view of a nonmechanical shutter as described herein.

FIG. II is a diagrammatic view of a plurality of nonmechanical shutters arranged on a nontransmissive substrate.

DESCRIPTION OF PREFERRED EMBODIMENTS

It has not been unexpectedly found that combinations of thermochromic compounds can be used in nonmechanical shutters for cameras and similar devices. The combinations of thermochromic compounds must include a colored form of a compound which is thermally rendered colorless and the colorless form of a compound which is thermally rendered colored, there being an interval of time between the respective color changes. The combinations of thermochromic compounds on a suitable transparent substrate are thus colored and, on heating, are converted successively to colorless, i.e., the shutter is transparent, and then colored form. The said combinations on the transparent substrate function as shutters in that the initial colored state and final colored state are not transmissive of light by absorption and/or reflection of the light. Thus, the colored form of the thermochromic compounds corresponds to a closed mechanical shutter whereas the colorless, i.e., transparent, form corresponds to an open mechanical shutter.

The preferred thermochromic compounds for use in this invention are benzopyrylspirans, especially those which are also photochromic. Such compounds are well known in the art and are described in many patent and literature references. Suitable compounds for the present use can be selected from the compounds described in the literature, e.g., in U.S. Pat. Nos. 2,710,274; 2,953,454; 3,100,778; 3,212,898; and 2,978,462; as well as *Journal of the American Chemical Society*, 81, 5605 (1959), and British Specification 1,019,911, all of which are incorporated into this disclosure by way of reference.

As hereinbefore mentioned, one of the thermochromic compounds (component A) of the present shutter should be in a colored form which is rendered colorless by heat. Such thermochromic compounds are quite numerous and well known. Generally, the intended compounds are colorless in the normal state but become colored when exposed to light of high energy such as ultraviolet light. The compounds are used in the present shutter in the colored form i.e., ultraviolet irradiated, in which form they generally persist until heated to revert to the colorless form. Alternatively, these compounds also can be converted to the colorless form by exposure to visible light, especially of high intensity, with or without heating.

Exemplary of such compounds, in the normal state, are substantially colorless compounds represented by the formula:

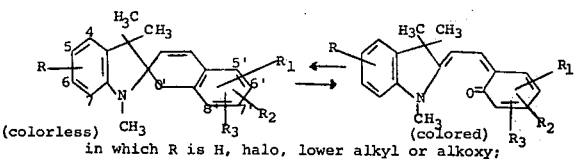

in which R is H, halo, lower alkyl or alkoxy;

$R_1$ is nitro, halo, or alkoxy; and $R_2$ and $R_3$ are each H, halo, alkoxy, alkyl or alkenyl. The ultraviolet exposure of the colorless form of these compounds converts them to the colored form. Additional thermochromic compounds are those in which the indole moiety is replaced by a benzopyran benzopyrylino or napthopyran moiety.

The other of the thermochromic compounds (component B) of the present shutter should be in a colorless form which is rendered colored by heat. Generally such compounds are only converted to a color form of high optical density by heat. Although some slight conversion to the colored form can take place with some of these compounds on exposure to ultraviolet light, the extent of such conversion is not significant in the present shutters.

Exemplary of the further compounds of the present shutter are the compounds represented by the foregoing structural formula in which substituents $R_1$ and $R_2$ are each nitro groups. Such dinitro compounds are particularly effective, and therefore preferred, since they readily undergo a change to colored form on heating and are converted to the colorless form by exposure to visible light, at the same time showing little effect on exposure to ultraviolet light when in the colorless form.

The foregoing structures for either of the thermochromic compounds of the present shutters are representative of the compounds intended and generally embrace the preferred compounds to be employed herein. Other compounds suitable as either or both of the thermochromic compounds of the present shutter can be selected on the basis of simple test procedures utilizing the criteria mentioned hereinbefore for determining the suitability of any combination of, or individual, component thermochromic compounds.

For individual component thermochromic compounds, the compound to be tested is subjected to heating and, if a color change occurs, it may be suitable as one or the other component of the thermochromic mixture of the present shutters. If the color change is from colorless to the colored form, the test compound may be suited as the colorless component particularly if the conversion does not occur to any significant extent on exposure to ultraviolet light and especially if the conversion is reversible on exposure to visible light.

If the color change is from colored to colorless, the test compound may be suited as the colored component particularly if the conversion is reversible with ultraviolet light.

Such test determinations are within the skill of the art and need not be elaborated on since the procedures involved are fully described in the literature.

The combination of the thermochromic compounds need not be restricted to one compound of each of the described types since combinations of more than one compound of each type can be used and are fully contemplated by the present invention.

In the shutter, the thermochromic compounds are applied to a transparent substrate by any of the methods generally used in the photographic art. The transparent substrate can be any of those normally employed in the photographic art, such as cellulose acetate, glass, polyamides or similar substances and the thermochromic compounds are conveniently applied to the substrate in a binder using the usual coating techniques. The binder selected should be compatible with the thermochromic compounds and should dissolve the compounds in the concentration employed. If desired, a plasticizer, e.g., dioctylphthalate may be incorporated to facilitate mixing of the components of the thermochromic layer. Care should be exercised in selecting the binder with or without plasticizer so that the binder does not adversely affect the photographic transparency of the shutter. Due to the high temperatures used in the aforementioned color changes, it is preferable to use binders and substrates which will not undergo appreciable distortion under the conditions described.

For most purposes, a convenient binder is polyvinyl acetate or even partially-hydrolyzed polyvinyl acetate or a polyester such as polyethylene terephthalate which have sufficient solvent capacity for the thermochromic compounds. The mixture of thermochromic compounds and binder are made homogeneous, e.g., by stirring, use of small amounts of compatible liquid solvents and/or plasticizers, and warming where necessary, and then layers of the homogeneous mixture are applied to the transparent substrate by painting, drawing, flowing or any of the photographic procedures generally employed for this purpose.

In general, the concentration of each thermochromic component of the mixture is in the range of from about 0.1 percent to about 2.0 percent based on the weight of binder. The use of larger amounts usually provides little, if any, advantage and is not preferred since uneconomical. A preferred range is from about 0.5 percent to about 1.0 percent.

Many of the photochromic compounds described herein consist of equilibrium mixtures of the spiro structure, the colorless form, and the open chain structure, the color form, particularly after standing under storage conditions. In preparing the shutters of the present invention, the component A compound is generally colorless while the component B compound is somewhat colored. After the shutter is prepared, the component compounds are converted to their useful form by exposing the shutter to visible light which will bleach any color due to the component B compound and then to ultraviolet light which will convert the component A compound to the colored form. The shutter is then ready for use in a camera or similar device.

To expose the photosensitive medium of the camera using the present shutter, all that is required is application of sufficient heat to effect the first color change (from color to colorless form of the component A compound). The color change for the hereinbeforedescribed preferred compounds will occur in the temperature range of from about 25° C. to about 200° C. Depending on the speed with which it is desired to open the shutter, the length of the shutter opening, and similar such considerations, the shutter can be control-heated to attain the desired result. For most purposes, fast heating is employed to quickly attain shutter opening and for only brief periods of time. For this reason, temperatures in the vicinity of 200° C. and even somewhat higher, e.g., up to 225° C., are used, since such temperatures ensure fast shutter opening for brief periods approximating the usual order of magnitude of shutter openings in photography. Of course, variation of the thermochromic mixture with the heating temperature remaining constant can also be used to vary the shutter opening time. All of these variables can be used to vary the response of the present shutters in their end use.

For heating the present shutters, a source of heat external to the camera or similar device can be used but it is more convenient to include in the camera heating means which can be activated by external means on the camera, as is a mechanical shutter. Such heating means can include, for example, a blast of hot fluid, either air or liquid; provision of an electrically heated substrate or matrix, such as nesa glass; intimate contact of the shutter with a hot surface, such as glass; microwaves; radio waves, or the like. Of these, microwave or radio frequency heating is preferred since it heats the shutter uniformly and controllably, thus ensuring uniform and controllable opening and closing of the shutter. Means for generating heat using microwaves are well known and fully described for which reason it is unnecessary to describe these means for the purpose of this disclosure.

After the shutter has been opened and then closed by heating, the shutter can be cocked by reversing the thermal color changes. This is readily accomplished by exposing the shutter to visible light to bleach the color compound (component B) to colorless and ultraviolet light to convert the colorless compound (component A) to the colored form, which is the original form of both and thus the shutter is ready for reuse. When exposing the shutter for cocking, the shutter should be separated from the photosensitive medium to avoid exposure to either form of light used. This can be accomplished by removing the shutter from the camera or by providing a non-light-transmissive flap or backup shutter disposed in the optical path between the shutter and photosensitive medium.

For cocking the shutter, it is convenient to provide both the visible and ultraviolet light by using a fluorescent light or a sun lamp, from which infrared is preferably filtered out.

In another aspect, the present invention contemplates provision of a shutter device which is comprised of a plurality of the described shutters arranged on a suitable support which is preferably made of a substance which does not transmit the activating radiation used for activating the photosensitive medium. Such an arrangement is shown in FIG. II where each nonmechanical shutter is designated by the numeral 1. The arrangement on the support is designed to permit successive use of the shutters so that the camera can be in use while the used shutters are being cocked as previously described. The total number of shutters is practically limitless and only limited by the geometry of the support and size of the camera or similar device. The camera can be provided with station positions where the used shutters are cocked by the aforesaid method.

For such application, the support for the multiple shutter device can be a circular disc with the shutters mounted around the outer periphery thereof. Alternatively the support can be a roll or circular belt of suitable material on which the shutters are mounted. Such forms of the multiple shutter device can be used as is the circular disc.

A further use of the present shutter and multiple shutter device is as a shutter in a laser beam device, particularly those used for laser beam writing since the thermochromic compounds generally will absorb frequencies emitted by the laser beam.

Using the present shutters, shuttering openings, i.e., periods of transparency, of as little as 0.001 seconds are obtained when microwave heating is used. With radiant or convection heating, the usual minimum shutter opening is in the vicinity of 0.01 seconds. With either form of heating, the shutter openings range up to 1-second duration and even longer as determined by the components of the shutter.

A further advantage of the present shutter devices is their ability to undergo opening at a controlled rate on a selective basis, since the area of transparency may be limited to only a small segment of the shutter at a given time. For example, heating with microwaves can be localized to a small area of the shutter and, as the heat effect "travels" across the shutter, the "shutter opening" travels across the shutter device. Correlation of the heat effect with required speed of opening across the shutter can be used to compensate for moving objects or camera motion, which has always been a problem using conventional shutters.

The following examples are given to further illustrate the invention.

EXAMPLE 1

Component A=1, 3, 3-trimethylindolino-6'-nitrobenzopyrylspiran

Component B=1, 3, 3-trimethylindolino-6', 8'-dinitrobenzopyrylospiran

Equal parts (0.5 percent based on the binder) of each of components A and B in polyvinyl acetate is coated on a polyethylene terephthalate sheet. The medium is exposed to visible light until all color is bleached out and then to ultraviolet light until color develops in the medium.

Heating the medium to about 190° C. with a hot plate causes the medium to become transparent to light and then the medium becomes colored, showing it to be effective as a shutter for a camera.

EXAMPLE 2

Component A=1, 3, 3-trimethylindolino-8'-nitrobenzopyrylospiran.

Component B=5-chloro-1, 3, 3-trimethylindolino-6', 8'-dinitrobenzopyrylospiran.

The procedure of Example 1 is repeated with these components A and B with similar results.

EXAMPLE 3

The procedure of Example 1 is repeated using each of the following compounds in place of component A with similar results:

7-methoxy-1, 3, 3-trimethylindolino-6'-nitrobenzopyrylospiran, 1, 3, 3-trimethylindolino-5', 7'-dichloro-6'-nitrobenzopyrylospiran 5-chloro-1, 3, 3-trimethylindolino-6'-nitrobenzopyrylospiran.

EXAMPLE 4

A camera is constructed of a light-tight housing and provided with the shutter prepared in Example 1, and a photosensitive film positioned so that the shutter falls in the optical path. The photosensitive film is silver halide-sensitized and sensitive to actinic light.

The camera is pointed at an illuminated object and the shutter is heated with a microware source to permit imaging of the illuminated object. Development of the film gave a satisfactory negative of the illuminated object.

In the foregoing examples, the color form of the photochromic compounds is red and absorbs in the region of 520—650 millimicrons. When using these shutters, the exposing light is preferably filtered to remove light outside the said region using conventional light filters. Particularly effective are dicroic filters which are available from the Baird-Atomic Corporation.

What I claim is:

1. A nonmechanical shutter comprising a transparent substrate having thereon a layer containing a first reversible thermochromic compound in its opaque colored form, and also having thereon a layer containing a second reversible thermochromic compound in its transparent colorless form, said second thermochromic compound extending over the same substrate region covered by said first thermochromic compound, said shutter also having heating means disposed to heat said thermochromic compounds, the reversible change of said colored thermochromic compound to its colorless transparent form occurring prior, by a finite period, to the reversible change of said colorless thermochromic compound to its colored opaque form in response to the application of heat.

2. A nonmechanical shutter of claim 1 wherein both of said thermochromic compounds are also photochromic.

3. A nonmechanical shutter of claim 2 including radiation means for supplying said photochromic compounds with activating radiation.

4. A nonmechanical shutter of claim 3 wherein said radiation means includes both a source of ultraviolet light and a source of visible light.

5. A nonmechanical shutter of claim 4 wherein said thermochromic compounds have the same color in their colored form.

6. A nonmechanical shutter of claim 1 comprising a plurality of shutters, the shutters being arranged on a nonlight-transmissive support therefor to permit successive use thereof.

7. A nonmechanical shutter of claim 6 wherein said thermochromic compounds are also photochromic.

8. A nonmechanical shutter of claim 7 including radiation means for supplying activating radiation to said photochromic compounds.

9. A nonmechanical shutter of claim 8 wherein said radiation means includes a source of ultraviolet light and a source of visible light.

10. A nonmechanical shutter of claim 5 wherein said heating means comprises a source of microwaves.

11. A nonmechanical shutter of claim 5 wherein said heating means comprises a source of radio frequency radiation.

12. A nonmechanical shutter of claim 5 wherein said heating means comprises a source of hot fluid.

13. A nonmechanical shutter of claim 5 wherein said colorless thermochromic compound comprises a normally colored photochromic compound bleached to its colorless form with visible light.

14. A nonmechanical shutter of claim 13 wherein said colored thermochromic compound comprises a normally colorless photochromic compound converted to its colored form by ultraviolet irradiation.

15. A nonmechanical shutter of claim 13 wherein said colorless thermochromic compound comprises a photochromic spiropyran bleached to its colorless form with visible light.

16. A nonmechanical shutter of claim 14 wherein said colored thermochromic compound comprises a normally colorless photochromic spiropyran converted to its colored form by ultraviolet irradiation.

17. A nonmechanical shutter of claim 15 wherein said spiropyran comprises 1, 3, 3-trimethylindolinodinitrobenzopyrylospiran.

18. A nonmechanical shutter of claim 16 wherein said spiropyran comprises 1, 3, 3-trimethylindolinobenzopyrylospiran.

19. A nonmechanical shutter of claim 15 wherein said spiropyran comprises 1, 3, 3-trimethylindolino-6', 8'-dinitrobenzopyrylospiran.

20. A nonmechanical shutter of claim 15 wherein the spiropyran is 1, 3, 3-trimethyl-5-chloroindolino-6', 8'-dinitrobenzopyrylospiran.

21. A nonmechanical shutter of claim 16 wherein said spiropyran comprises 1, 3, 3-trimethylindolino-8'-nitrobenzopyrylospiran.

22. A nonmechanical shutter of claim 16 wherein said spiropyran comprises 1, 3, 3,-trimethylindolino-6'-nitrobenzopyrylospiran.

23. A nonmechanical shutter of claim 16 wherein said spiropyran comprises 5-chlor-1, 3, 3-trimethylindolino-6'-nitrobenzopyrylospiran.

24. A nonmechanical shutter of claim 15 wherein said spiropyran comprises a benzopyrylinobenzopyrylospiran.